US012769635B2

(12) United States Patent
Hulick, Jr. et al.

(10) Patent No.: US 12,769,635 B2
(45) Date of Patent: Oct. 20, 2026

(54) SERVICE MESH MONITORING WITH INFRASTRUCTURE AWARENESS

(71) Applicant: Cisco Technology, Inc., San Jose, CA (US)

(72) Inventors: Walter Theodore Hulick, Jr., Pearland, TX (US); Thomas Szigeti, Vancouver (CA); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/910,642

(22) Filed: Oct. 9, 2024

(65) Prior Publication Data

US 2026/0099417 A1 Apr. 9, 2026

(51) Int. Cl.

| | |
|---|---|
| ***G06F 11/30*** | (2006.01) |
| ***G06F 11/32*** | (2006.01) |
| ***G06F 11/34*** | (2006.01) |
| ***G06F 40/205*** | (2020.01) |
| *G06F 11/36* | (2006.01) |

(52) U.S. Cl.

CPC ............ *G06F 11/328* (2013.01); *G06F 11/30* (2013.01); *G06F 11/34* (2013.01); *G06F 11/3466* (2013.01); *G06F 40/205* (2020.01); *G06F 11/3409* (2013.01); *G06F 11/36* (2013.01)

(58) Field of Classification Search

CPC .. G06F 11/328; G06F 40/205; G06F 11/3466; G06F 11/3051; G06F 11/327; G06F 11/3055; G06F 11/30; G06F 11/34; G06F 11/3409

See application file for complete search history.

(56) References Cited

U.S. PATENT DOCUMENTS

| | | | | |
|---|---|---|---|---|
| 11,606,329 | B1 | 3/2023 | Steben et al. | |
| 11,736,559 | B2 * | 8/2023 | Nair | H04L 47/20 709/223 |
| 12,135,627 | B1 * | 11/2024 | Sharma | G06F 11/3072 |
| 2019/0089597 | A1 * | 3/2019 | Pathak | H04L 41/5051 |
| 2021/0058306 | A1 * | 2/2021 | Szigeti | H04L 41/0686 |
| 2022/0046084 | A1 | 2/2022 | Nair et al. | |
| 2022/0311681 | A1 * | 9/2022 | Palladino | G06F 11/3428 |
| 2023/0006889 | A1 | 1/2023 | Thyagaturu et al. | |
| 2023/0059339 | A1 * | 2/2023 | Rangarajan | G06F 8/61 |
| 2023/0099370 | A1 * | 3/2023 | Parla | H04L 41/22 709/224 |
| 2023/0412572 | A1 * | 12/2023 | Turner | H04L 63/0428 |
| 2024/0012911 | A1 * | 1/2024 | Yannuzzi | G06F 21/602 |
| 2024/0022609 | A1 | 1/2024 | Smith et al. | |

(Continued)

*Primary Examiner* — Jonathan D Gibson

(74) *Attorney, Agent, or Firm* — Lee & Hayes, P.C.

(57) ABSTRACT

In one embodiment, service mesh monitoring with infrastructure awareness is provided herein. An example method herein may comprise: parsing, by a service mesh manager process, a package manager chart to learn a plurality of cloud resources associated with a given application; monitoring performance metrics for each individual resource for the plurality of cloud resources; aggregating the performance metrics for each individual resource into an overall performance level of the given application; and generating a holistic health report of the overall performance level of the given application that is further indicative of the performance metrics for each individual resource.

20 Claims, 9 Drawing Sheets

(56) References Cited

U.S. PATENT DOCUMENTS

| | | | | |
|---|---|---|---|---|
| 2024/0126530 | A1 | 4/2024 | Kairali et al. | |
| 2024/0259286 | A1* | 8/2024 | Shah | H04L 43/026 |
| 2024/0330031 | A1* | 10/2024 | Eberlein | G06F 21/55 |
| 2024/0370286 | A1* | 11/2024 | Pandi | G06F 11/3055 |
| 2026/0039670 | A1* | 2/2026 | Shah | H04L 63/1416 |
| 2026/0099417 | A1* | 4/2026 | Hulick, Jr. | G06F 11/328 |

* cited by examiner

SERVICE MESH MONITORING WITH INFRASTRUCTURE AWARENESS

TECHNICAL FIELD

The present disclosure relates generally to computer networks, and, more particularly, to service mesh monitoring with infrastructure awareness.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Notably, a service mesh can provide rich metrics for pods running in a Kubernetes environment, including communication latency, traffic rates, error rates, error responses, node CPU, and memory utilization statistics, etc. However, a service mesh has limited awareness of the objects it is monitoring. For example, a service mesh is not application-aware, meaning it has no understanding of which pods, services, and objects comprise the component microservices for a given cloud native application. Neither is a service mesh configuration-aware, that is, having an understanding of how the configuration of a given resource in the Kubernetes environment affects the overall performance of the object. Neither is a service mesh software composition aware, that is, having understanding of the software components running inside a given pod.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
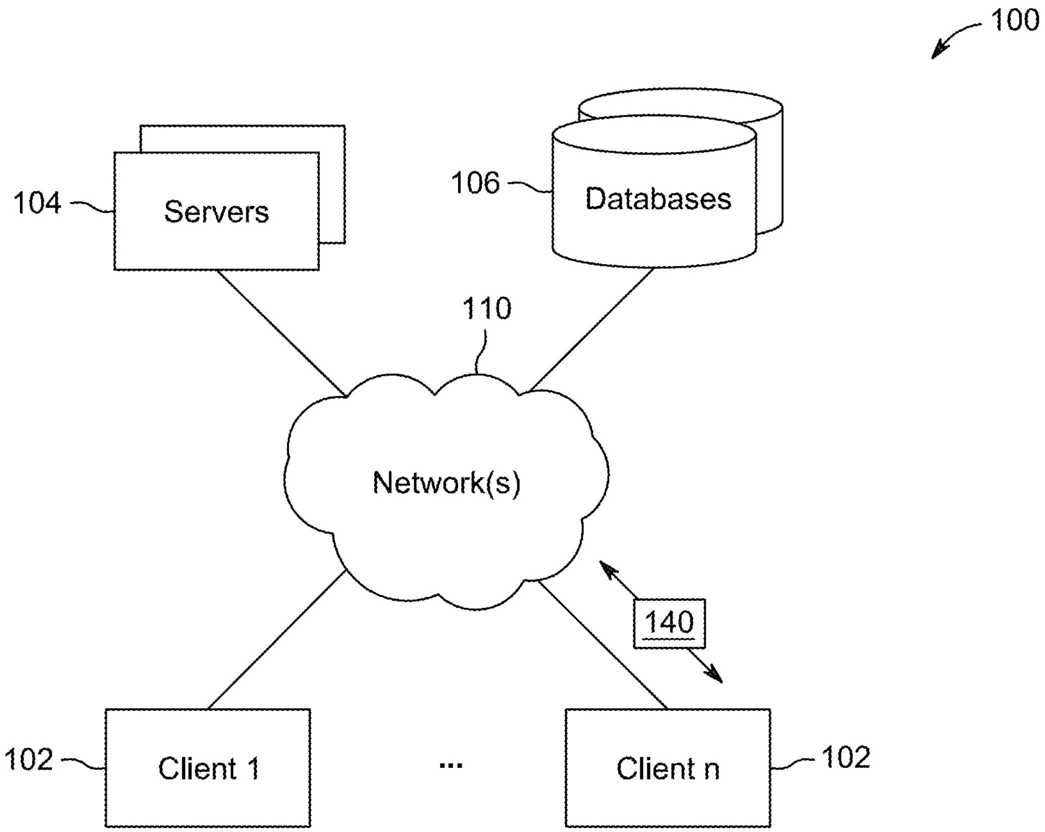
FIG. 1 illustrates an example computing system.

According to one or more embodiments of the disclosure, service mesh monitoring with infrastructure awareness is provided herein. In one embodiment, an example method herein may comprise: parsing, by a service mesh manager process, a package manager chart to learn a plurality of cloud resources associated with a given application; monitoring performance metrics for each individual resource for the plurality of cloud resources; aggregating the performance metrics for each individual resource into an overall performance level of the given application; and generating a holistic health report of the overall performance level of the given application that is further indicative of the performance metrics for each individual resource.

In one embodiment, the service mesh manager process further comprises: parsing individual configurations of the plurality of cloud resources into specific resource configurations; correlating the performance metrics with the specific resource configurations; and reporting the performance metrics as correlated with the specific resource configurations within the holistic health report.

In one embodiment, the service mesh manager process further comprises: parsing individual software compositions of the plurality of cloud resources into specific software compositions based on a software bill of materials; correlating the performance metrics with the specific software compositions; and reporting the performance metrics as correlated with the specific software compositions within the holistic health report.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (Saas) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
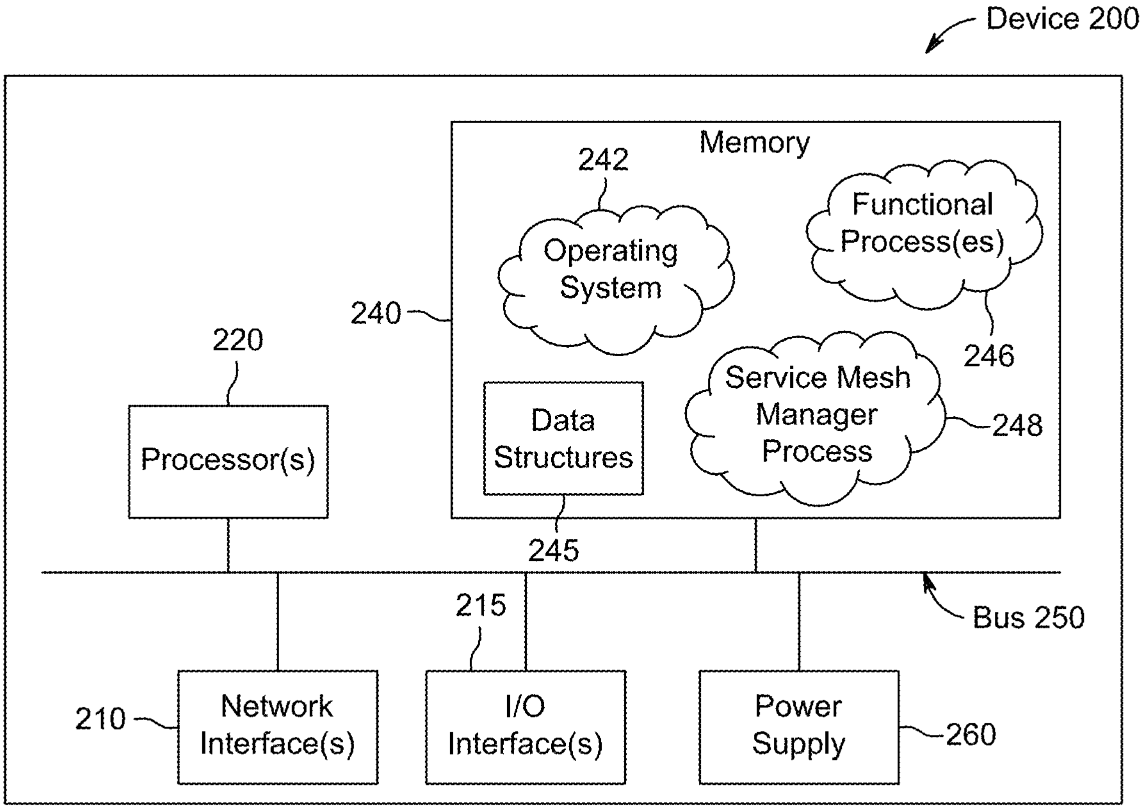
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a service mesh manager process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

Notably, the techniques herein may employ any number of machine learning techniques, such as to evaluate ingested data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various implementations, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (Saas) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
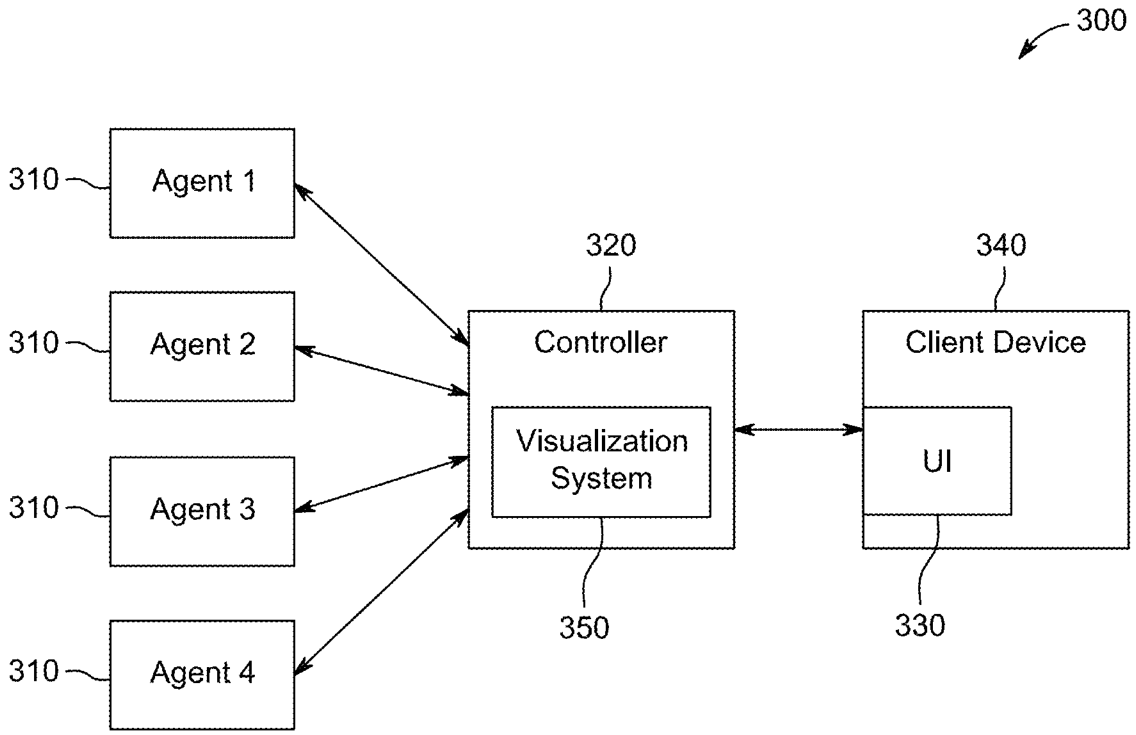
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (Saas) implementation, an instance of controller 320 may be hosted remotely by a provider of the observability intelligence platform 300. In an illustrative on-premises (On-Prem) implementation, a controller instance may be installed locally and self-administered.

The controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Service Mesh Monitoring With Infrastructure Awareness—

As noted above, a service mesh can provide rich metrics for pods running in a Kubernetes environment, including communication latency, traffic rates, error rates, error responses, node CPU, and memory utilization statistics, etc. However, as also noted above, a service mesh has limited awareness of the objects it is monitoring. For example, a service mesh is not application-aware, meaning it has no understanding of which pods, services, and objects comprise the component microservices for a given cloud native application. Neither is a service mesh configuration-aware, that is, having an understanding of how the configuration of a given resource in the Kubernetes environment affects the overall performance of the object. Neither is a service mesh software composition aware, that is, having understanding of the software components running inside a given pod, which it could then correlate performance metrics with.

The techniques herein, therefore, provide for service mesh monitoring with infrastructure awareness, enriching service mesh management solutions to make them application-aware, configuration-aware, and software-composition aware, so as to enrich their metrics with superior context and correlation, so that these solutions can deliver new insights into application performance to both developers and operators. In particular, the techniques herein enhance service mesh monitoring solutions, to make these:

- application-aware, e.g., by parsing Helm charts, so that the aggregate health of a given application can be effectively and accurately monitored;
- configuration-aware, e.g., by parsing the YAML files of Kubernetes objects, so that developers are provided with metrics to reflect the most efficiently-performing configuration options; and
- software-composition-aware, e.g., by either generating or ingesting SBOM information, so that developers are provided with metrics to reflect the most efficiently-performing software-component options.

Specifically, according to one or more embodiments of the disclosure as described in detail below, an example method herein may comprise: parsing, by a service mesh manager process, a package manager chart to learn a plurality of cloud resources associated with a given application; monitoring performance metrics for each individual resource for the plurality of cloud resources; aggregating the performance metrics for each individual resource into an overall performance level of the given application; and generating a holistic health report of the overall performance level of the given application that is further indicative of the performance metrics for each individual resource. In one embodiment, the service mesh manager process further comprises: parsing individual configurations of the plurality of cloud resources into specific resource configurations; correlating the performance metrics with the specific resource configurations; and reporting the performance metrics as correlated with the specific resource configurations within the holistic health report. In one embodiment, the service mesh manager process further comprises: parsing individual software compositions of the plurality of cloud resources into specific software compositions based on a software bill of materials; correlating the performance metrics with the specific software compositions; and reporting the performance metrics as correlated with the specific software compositions within the holistic health report.

Notably, at a high-level, many cloud services are being implemented through containerized orchestrations, such as Kubernetes. Kubernetes (K8s) is an open-source system designed to automate the deployment, scaling, and management of containerized applications. It is maintained by a global community of contributors. Kubernetes organizes multiple computers, whether virtual or physical, into a cluster capable of running workloads in containers.

A service mesh is a software infrastructure that facilitates secure, observable, and managed communication between services within an application, commonly used in microservices architectures but applicable to any environment with complex networking. This dedicated layer handles service-to-service communications, often through containerized microservices.

In a service mesh, network proxies are paired with each service, forming the "data plane" that intercepts and processes calls between services. The "control plane" coordinates the proxies and provides APIs for operations teams to monitor and manage the network. This architecture improves observability, enhances security, and automates retries for failed requests, making it a valuable tool in managing modern software systems.

Figure 4:
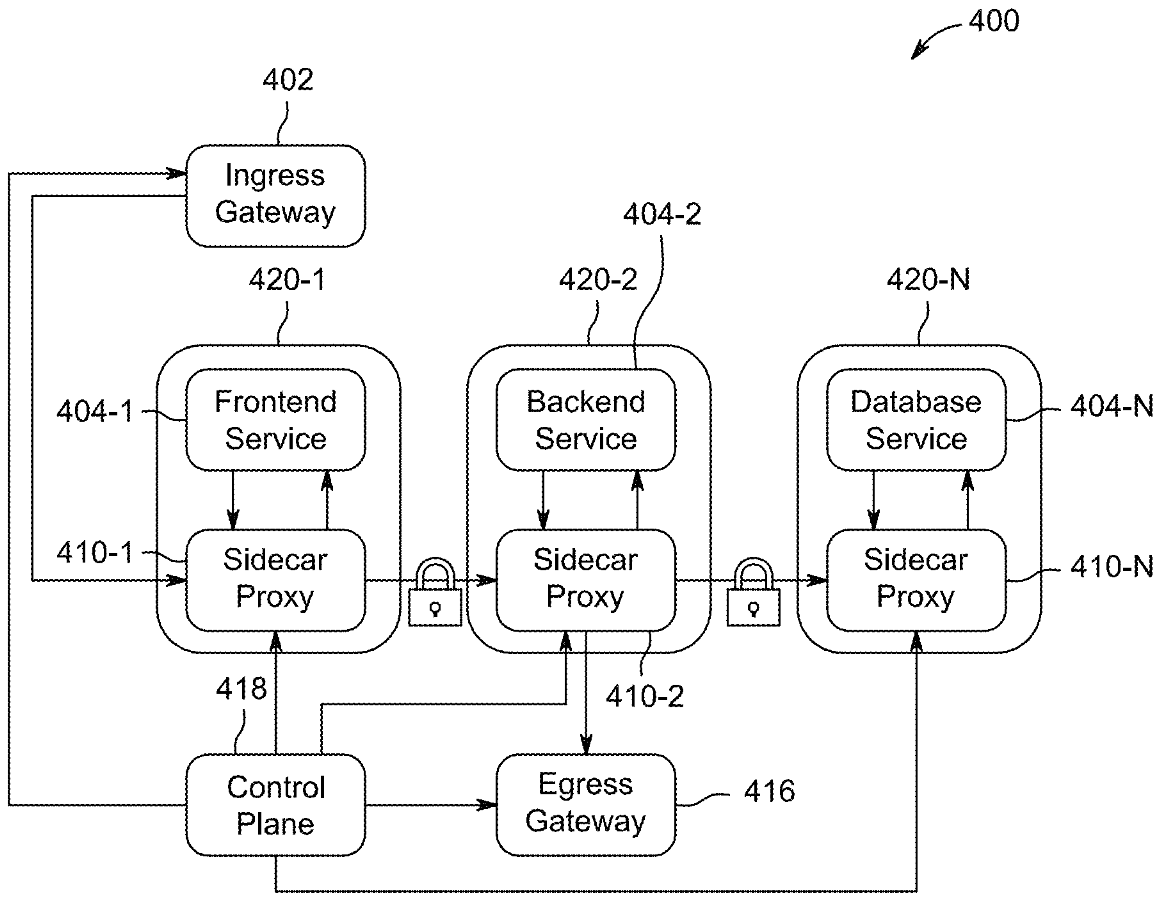
FIG. 4 illustrates an example of a service mesh architecture for communication between services or microservices.

FIG. 4 illustrates a simplified example of a service mesh architecture 400 for facilitating communication between services or microservices. References made herein to a service(s) or microservice(s) should be understood as being interchangeable and inclusive of the one, the other, or both. Service mesh architecture 400 may be a Kubernetes service mesh which is a is a dedicated infrastructure layer for handling service-to-service communication. For example, service mesh architecture 400 may include Kubernetes pods 420 (e.g., 420-1 . . . 420-N) which may comprise one or more containers. Here, each of the microservices 404 (e.g., 404-1 . . . 404-N) or portions of an application within a respective one of the Kubernetes pods 420 of a Kubernetes service mesh. For instance, such microservices may illustratively comprise a frontend service 404-1, a backend service 404-2, a database service 404-*n*, and any number of other services as needed for a particular application. Overseeing the control plane traffic in the service mesh between such pods may be a service mesh control plane 418, such as Istio or the like.

By default, there is typically no security between microservices 404. However, as shown, optional sidecar proxies (e.g., 410-1 . . . 410-N) may be associated with each of the microservices 404. Sidecar proxies 410 may be separate containers running along the application container used for running isolated peripheral tasks such as logging, proxying, configuration management, data security, etc. They may share the same overall lifecycle management as the parent container such that creation/termination events are in sync. The sidecar proxies 410 may be hosted and/or execute within a same one of the Kubernetes pods 420 as the microservice that it supports.

In various implementations, each microservice may be associated with a corresponding sidecar proxy that is also executed within the microservice's Kubernetes pods and which may be used to perform any number of functions with respect to microservice. For instance, sidecar proxies 410 may include lookup functions, firewall functions, security functions, or the like, as is typically done today. In service meshes having a goal of end-to-end encryption, a service mesh may inject a sidecar proxy with a TLS certificate into each pod. Control planes may also come with a certificate authority that rotates the certificates.

With a service mesh, all of the traffic may be routed through ingress (e.g., ingress gateway 402) and egress (e.g., egress gateway 416) through one of the sidecar proxies 410. The sidecar proxies 410 may then add tracing headers to a request. When a request comes through the ingress gateway 402 to the front end that goes to the back end, a trace may be generated for all of those requests without having to instrument code.

Operationally, to enhance service mesh metrics to become infrastructure-(ecosystem-) aware, a first implementation begins with making them "application-aware". In particular, according to the techniques herein, a service mesh manager (such as Calisti) can be programmed to read charts from Kubernetes package-managers, such as Helm.

In particular, Helm is an open-source project which was originally created by DesiLabs and donated to CNCF, which now maintains it. The original goal of Helm was to provide users with a better way to manage all the Kubernetes YAML files created on Kubernetes projects. The path Helm took to solve this issue was to create "Helm Charts". Each chart is a bundle with one or more Kubernetes manifests—a chart can have child charts and dependent charts as well.

This means that Helm installs the whole dependency tree of a project if the install command is run for the top-level chart. That is, there is just a single command to install an entire application, instead of listing the files to install via kubectl, as will be appreciated by those skilled in the art.

Charts allow for versioning of manifest files as well, similar to Node.js or any other package. This allows for the installation of specific chart versions, which means keeping specific configurations for certain infrastructures in the form of code. Helm also keeps a release history of all deployed charts, allowing for backtracking to a previous release if something went wrong. Helm also supports Kubernetes natively, which means there is no need to write any complex syntax files or anything to start using Helm. That is, programmers can simply place their template files into a new chart.

According to the techniques herein, therefore, a service mesh manager can parse a Helm chart to learn the details of every Kubernetes resource that comprises a given application (including pods, services, deployments, secrets, roles, bindings, ingresses, etc.). In other words, the package manager chart (e.g., Helm chart) indicates which pods get grouped together for an associated application, i.e., detailing the resources that are assigned to an application for its deployment that provide its functionality. The techniques herein thus digest this chart to determine the resources that the service mesh manager specifically should monitor in order to capture the performance of the application as a whole.

Accordingly, as the service mesh manager monitors key performance indicators (KPIs) for these individual resources, it intelligently aggregates these to represent the health of the application as a whole. Providing a high-level view of the heath of an application as a whole would be very valuable to operators.

Figure 5:
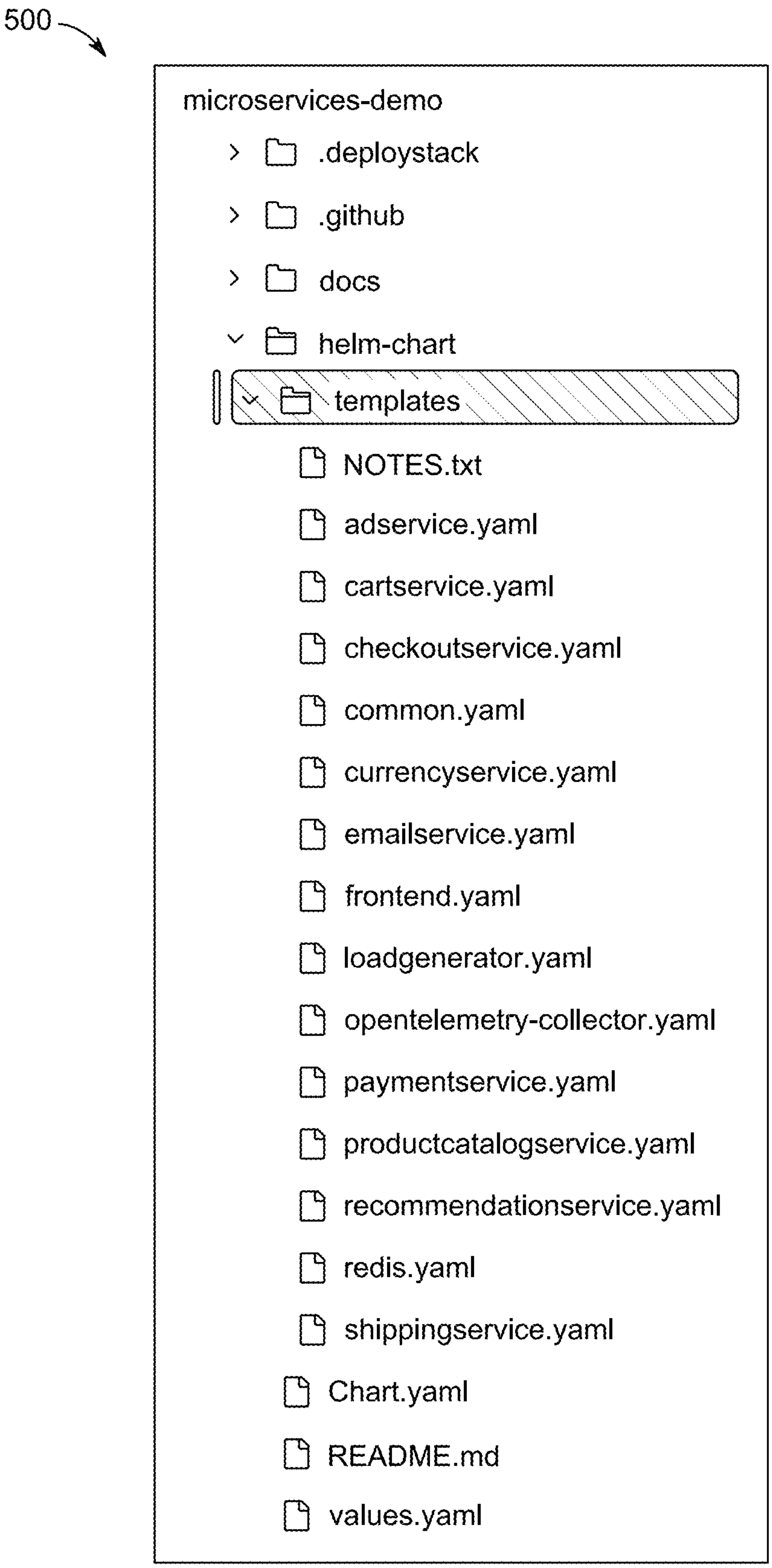
FIG. 5 illustrates an example of a package manager chart.

As an example, assume an example microservice-based application "demo" (e.g., an online boutique store) that can be deployed with a Helm chart. FIG. 5 illustrates an example of a package manager chart 500 (e.g., a Helm chart). As noted, Helm charts include the individual Kubernetes resource templates (e.g., YAML files) for all components of the application, including services, deployments, gateways, etc. For instance, as shown, resource templates in this chart may be things such as adservice.yaml, cartservice.yaml, checkoutservice.yaml, and so on.

According to the techniques herein, a parsing of these YAML files would identify key components (such as services, gateways, deployments, etc.) that would allow for identifying the component resources that composes an application. With such an awareness, the service mesh monitoring solution could be expanded to combine the key performance indicators (KPIs) of these individual resources (which it is already monitoring) into an aggregate health score of the application as a whole.

Figure 6:
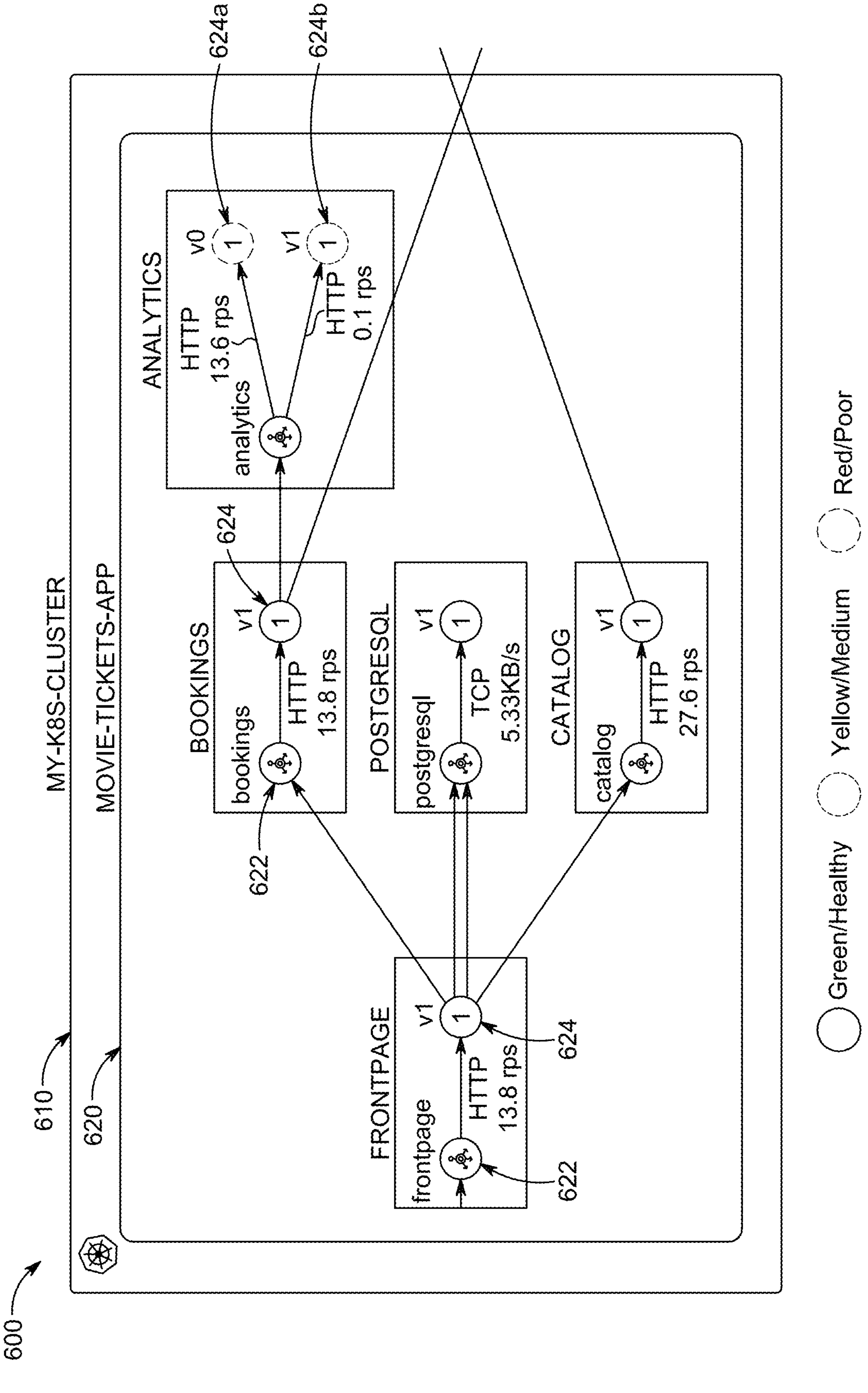
FIG. 6 illustrates an example graphical user interface (GUI) showing a visualization of application-aware service mesh monitoring.

FIG. 6 illustrates a graphical user interface, GUI 600, showing a visualization of application-aware monitoring (e.g., based on the Calisti UX from Cisco Systems, Inc., but other representations may be used in accordance with the techniques herein). For instance, within a cluster 610 (e.g., "MY-K8S-CLUSTER") is shown a simplified portion of an application 620 (e.g., "MY-MOVIE-TICKETS-APP) and is associated components, namely microservices 622 and workloads 624. As shown, the health of individual microservices and workloads are represented by the color (or shading, dashing, etc.) of their respective circles (e.g., green/solid=healthy, yellow/dotted=medium, red/dashed=poor). However, the health of the overall application (e.g., the MY-MOVIE-TICKETS-APP) is also being represented, specifically by the color/dashing of the rectangle that encompasses all the components of the app. Overall, the application 620 is portrayed as healthy (as the rectangle is green/solid), while some individual components are noted to be experiencing health issues (e.g., notably the ANALYTICS V1 workload 624*a*, which has a red/dashed circle indicating poor health, and the ANALYTICS V2 workload 624*b*, which has a yellow/dotted circle indicating medium health).

While adding Helm-chart parsing capabilities to the service mesh manager allows it to identify all resources for an application, this capability can then be expanded to make the service mesh manager configuration-aware by further parsing the individual configurations of each application resource object. Such parsing of resource configurations enables the service mesh manager solution to correlate performance metrics with specific resource configurations. In one embodiment, this may be accomplished by tying the service mesh manager to an AI/ML engine.

Figure 7:
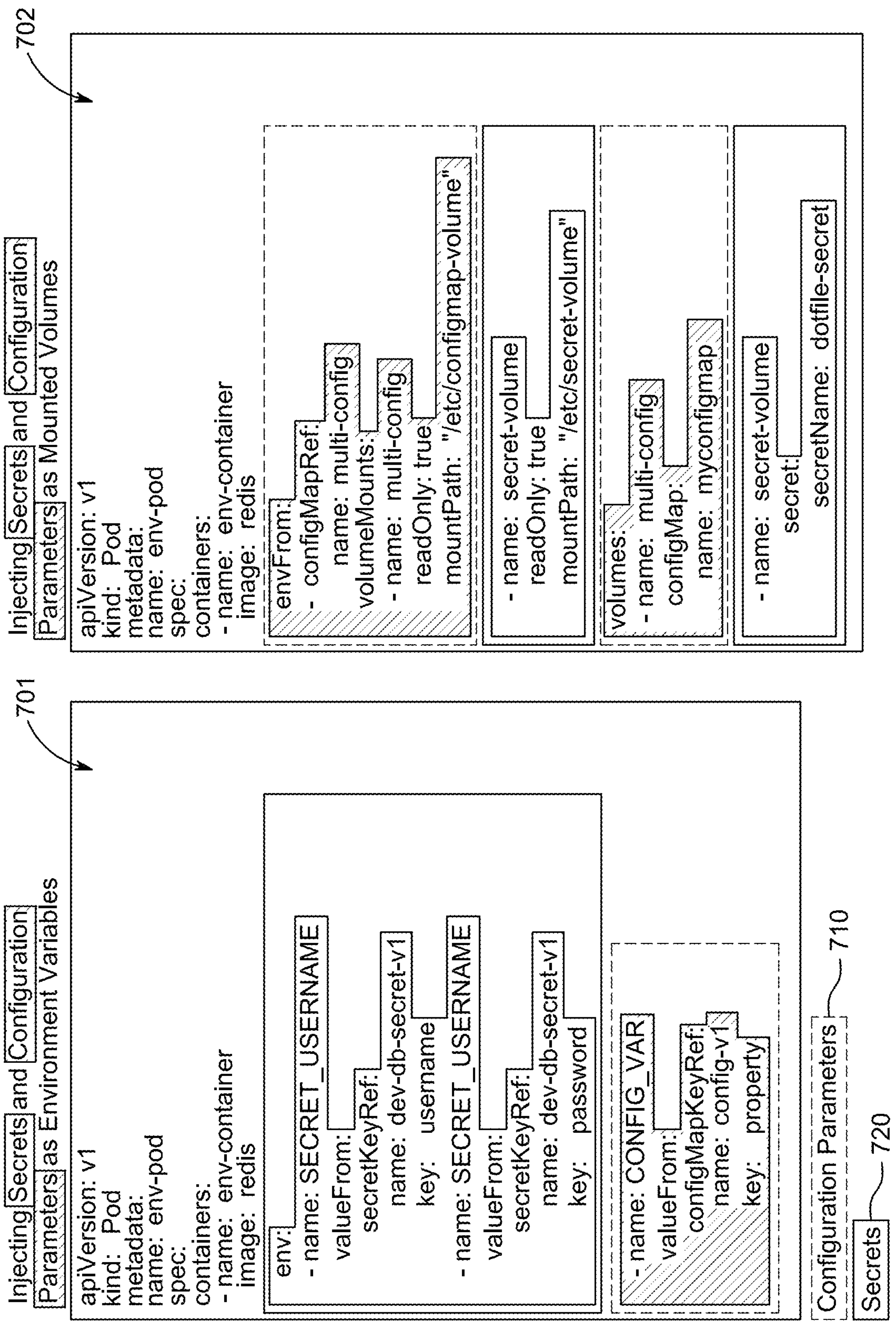
FIG. 7 illustrates an example of pods with different configurations coded to achieve a same result in accordance with configuration-aware service mesh monitoring.

As an example, there are often multiple methods to achieve a given objective with Kubernetes. For instance, as shown in FIG. 7, configuration parameters 710 or secrets 720 can be injected into pods as environment variables as shown in method 701, or via mounted volumes (of config-maps and secrets, respectively), as shown in method 702.

It may be that one method is more efficient than another. For example, it may become evident that injecting operational parameters into a pod as environment variables may be more efficient than injecting the same parameters via mounted volumes. By making the system configuration aware according to the techniques herein, particularly as there is often more than one way to achieve a particular result, such insights would be very valuable to developers of high-performance applications. In this manner, for instance, if a developer wants to make configuration changes to an application, they may spin up the containers with the different configurations, monitor their performance with configuration awareness, and then may select the optimal performer, accordingly.

Finally, the service mesh manager can be enhanced to become software-composition aware by integrating it with (or providing it with) a Software Bill of Materials (SBOM) tool. In particular, SBOMs allow for the quick identification of the software components involved in everything from transactions to application programming interfaces (APIs) in applications. In general, an SBOM is typically constructed today by the build system and then bundled with the software produced by that system. That is, SBOMs provide a formal record containing the details and supply chain relationships of various components used in building software. Traditionally, software developers and vendors often create products by assembling existing open source and commercial software components. The SBOM enumerates these components in a product. Accordingly, transparency from SBOMs aids multiple parties across the software lifecycle, including software developers, purchasers, and operators.

Figure 8:
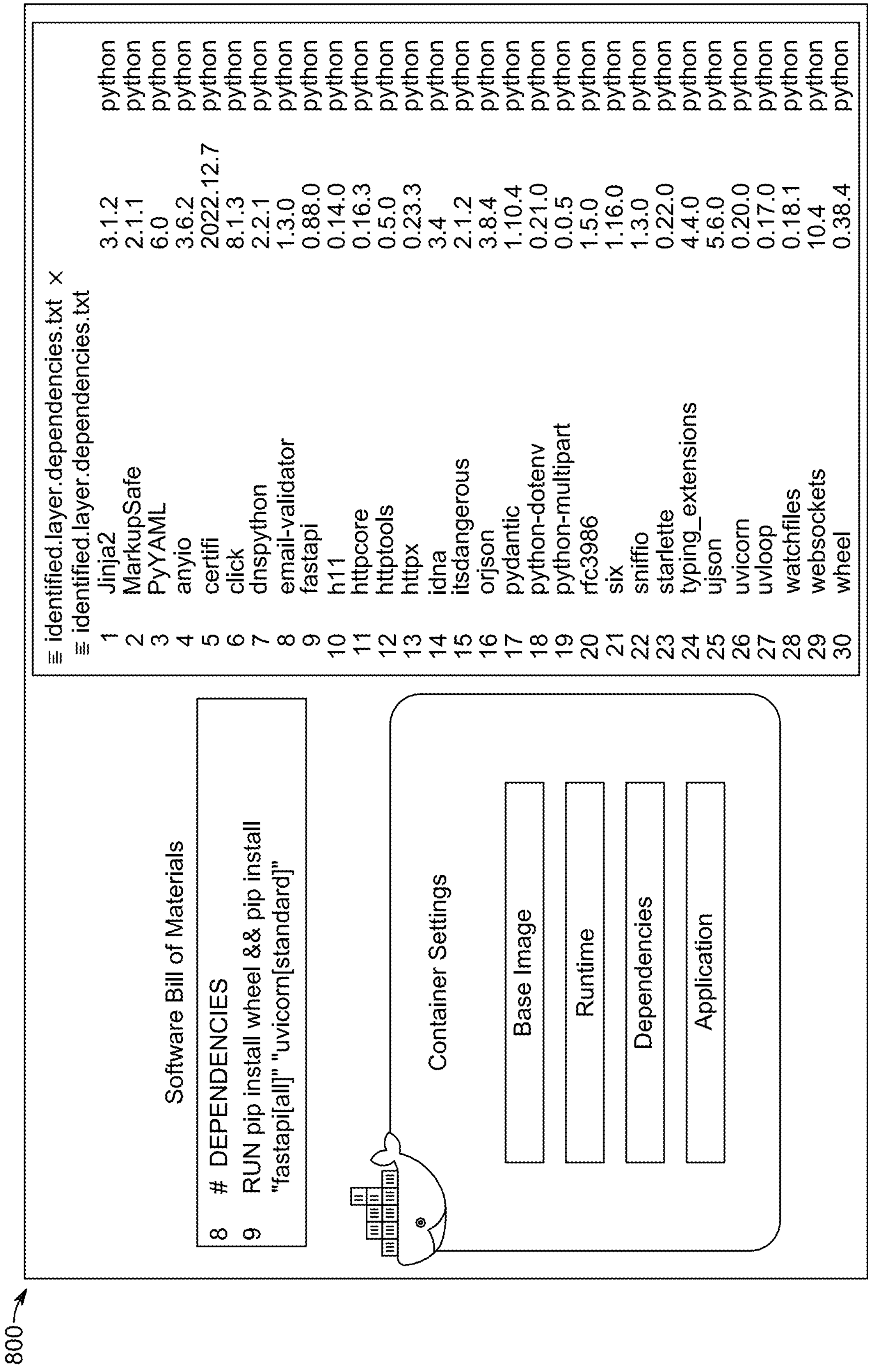
FIG. 8 illustrates an example software bill of materials (SBOM) tool GUI for software-component-aware service mesh monitoring.

In general, a SBOM is a nested inventory, which can be thought of as a list of ingredients that make up software components of the software system. SBOM tools may thus be used to allow the service mesh manager to become software-composition aware by inspecting the SBOM to determine such dependencies. Such SBOM tools may include, but are not limited to, Fossa, Spectral, Jit, Jfrog, Snyk, or Panoptica, the Cisco Cloud Application Security solution, as illustrated generally in the SBOM tool GUI 800 of FIG. 8.

While SBOMs are typically used in a security context, for software composition analysis, these can nonetheless be leveraged for a different purpose entirely; namely: to correlate container software composition with performance metrics. In general, for instance, infrastructure aware service mesh monitoring herein may be configured to monitor the pods, parse their SBOMs, and track and correlate performance according to their software compositions in order to determine certain combinations of software that provide higher (or lower) performance. AI/ML tools can also again be leveraged to quickly identify key insights, such as which software compositions deliver the best microservice performance. Such software-composition-aware insights would again be highly valuable to developers.

Figure 9:
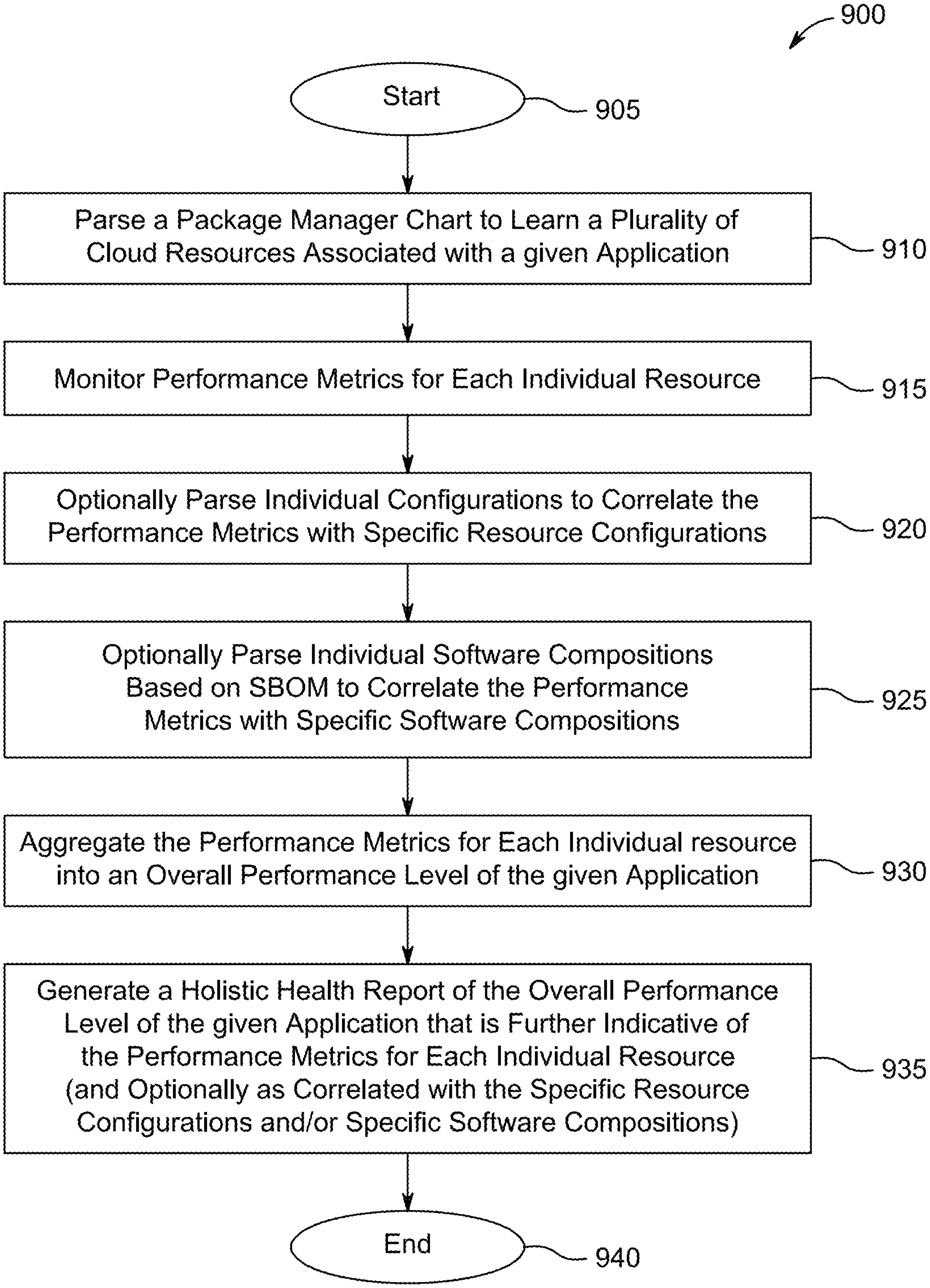
FIG. 9 illustrates an example procedure for service mesh monitoring with infrastructure awareness.

In closing, FIG. 9 illustrates an example simplified procedure for service mesh monitoring with infrastructure awareness in accordance with one or more embodiments described herein, particularly from the perspective of a service mesh manager process. For example, a non-generic, specifically configured device (e.g., device 200, an apparatus) may perform procedure 900 by executing stored instructions (e.g., process 248, such as a service mesh manager process). The procedure 900 may start at step 905, and continues to step 910, where, as described in greater detail above, a service mesh manager parses a package manager chart (e.g., a Helm chart) to learn a plurality of cloud resources associated with a given application (e.g., where the plurality of cloud resources are selected from a group consisting of: pods; services; deployments; secrets; roles; bindings; ingresses; gateways; databases; etc.).

In step 915, the service mesh manager may then monitor performance metrics for each individual resource for the plurality of cloud resources, as described above. Note that in step 920, the techniques herein may optionally parse individual configurations of the plurality of cloud resources into specific resource configurations for correlating the performance metrics with the specific resource configurations. For example, this may be based on monitoring operation of the given application using a machine learning engine to detect the specific resource configurations, or else based on examining YAML files of the given application to learn the specific resource configurations, or otherwise determining the specific resource configurations, accordingly. Also, in step 925, the techniques herein may optionally parse individual software compositions of the plurality of cloud resources into specific software compositions based on a software bill of materials (SBOM) for correlating the performance metrics with the specific software compositions as detailed above.

In step 930, the service mesh manager may aggregate the performance metrics for each individual resource into an overall performance level of the given application as described herein.

In step 935, the service mesh manager may then generate a holistic health report of the overall performance level of the given application that is further indicative of the performance metrics for each individual resource. In one embodiment, the techniques herein may thus also comprise reporting the performance metrics as correlated with the specific resource configurations within the holistic health report, and/or reporting the performance metrics as correlated with the specific software compositions within the holistic health report, accordingly. Note, too, that the techniques herein may comprise providing the holistic health report via a graphical user interface with representations of an overall health for the given application and an individualized health for each individual resource.

Other steps may also be included in the procedure 900, such as monitoring operation of the given application using a machine learning engine to provide insights based on the performance metrics as correlated with the specific software compositions, among others.

Procedure 900 may end at step 940.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

The techniques described herein, therefore, provide for service mesh monitoring with infrastructure awareness. The techniques herein go beyond containers and look into the internal elements/components of a container and how they are correlated to performance, including configurations and software compositions of such resources. In particular, the techniques herein enable a service mesh manager with application-awareness via parsing package-manager charts and aggregating application-component metrics to represent an application as a whole. Certain embodiments also enable a service mesh manager with configuration-awareness via parsing package-manager charts and an AI/ML engine to parse individual resource configurations, and then correlate performance metrics for these resources based on their configurations. In still other embodiments as detailed above, the techniques herein may enable a service mesh manager with container software awareness via an SBOM tool to correlate microservice performance metrics with container software compositions. While there are many service mesh solutions available, no current solution has application-awareness, configuration-awareness, nor software-composition awareness, as provided by the techniques herein.

Illustratively, the techniques described herein may be performed by hardware, software, and/or firmware, (e.g., an "apparatus") such as in accordance with the service mesh manager process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

In some implementations, an illustrative apparatus herein may comprise: one or more network interfaces to communicate with a network; a processor coupled to the one or more network interfaces and configured to execute one or more processes; and a memory configured to store a service mesh manager process that is executable by the processor, the service mesh manager process comprising: parsing a package manager chart to learn a plurality of cloud resources associated with a given application; monitoring performance metrics for each individual resource for the plurality of cloud resources; aggregating the performance metrics for each individual resource into an overall performance level of the given application; and generating a holistic health report of the overall performance level of the given application that is further indicative of the performance metrics for each individual resource.

In still other implementations, a tangible, non-transitory, computer-readable medium storing program instructions that cause a device to execute a process comprising: parsing, as a service mesh manager, a package manager chart to learn a plurality of cloud resources associated with a given application; monitoring performance metrics for each individual resource for the plurality of cloud resources; aggregating the performance metrics for each individual resource into an overall performance level of the given application; and generating a holistic health report of the overall performance level of the given application that is further indicative of the performance metrics for each individual resource.

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

As used herein, the terms "application" and "applications" generally refer to a computer program or computer programs that are designed to carry out a specific task or tasks other than task(s) relating to the operation of the computer itself. In particular, an "application" can refer to a collection of executable computer code that is provided to, or is integrated into, a software system. As a result, the "application" or "applications" discussed herein can refer to any collection computer code that is executed by, or provided by, the software system.

By way of example, the applications mentioned herein can be host applications that run on various computing systems, such as a physical computer (e.g., a desktop, a laptop, a smartphone, a tablet, a phablet, etc.), a virtual computer (e.g., a thin client, a virtual machine, a Linux container, etc.), a data center (e.g., rack server, supercomputer, etc.), and/or a software defined data center (e.g., bare metal server), etc. Accordingly, the applications described herein can be locally provided host applications, virtually provided host applications, and so on and so forth.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

parsing, by a service mesh manager associated with a control plane of a service mesh, a package manager chart to learn a plurality of cloud resources within the service mesh that are associated with a given application, thereby making the service mesh manager application aware for the given application;

injecting, by the service mesh, a respective sidecar proxy into each pod corresponding to the given application;

monitoring, by the service mesh manager, performance metrics for each individual resource for the plurality of cloud resources, wherein at least a portion of the performance metrics are generated based on traffic routed through the respective sidecar proxies;

aggregating, by the service mesh manager, the performance metrics for each individual resource into an overall performance level of the given application; and generating, by the service mesh manager, a holistic health report of the overall performance level of the given application that is further indicative of the performance metrics for each individual resource.

2. The method of claim 1, further comprising:

parsing individual configurations of the plurality of cloud resources into specific resource configurations;

correlating the performance metrics with the specific resource configurations; and reporting the performance metrics as correlated with the specific resource configurations within the holistic health report.

3. The method of claim 2, wherein parsing individual configurations of the plurality of cloud resources into specific resource configurations comprises:

monitoring operation of the given application using a machine learning engine to detect the specific resource configurations.

4. The method of claim 2, wherein parsing individual configurations of the plurality of cloud resources into specific resource configurations comprises:

examining YAML files of the given application to learn the specific resource configurations.

5. The method of claim 1, further comprising:

parsing individual software compositions of the plurality of cloud resources into specific software compositions based on a software bill of materials;

correlating the performance metrics with the specific software compositions; and reporting the performance metrics as correlated with the specific software compositions within the holistic health report.

6. The method of claim 5, further comprising:

monitoring operation of the given application using a machine learning engine to provide insights based on the performance metrics as correlated with the specific software compositions.

7. The method of claim 1, further comprising:

providing the holistic health report via a graphical user interface with representations of an overall health for the given application and an individualized health for each individual resource.

8. The method of claim 1, wherein the package manager chart comprises a Helm chart.

9. The method of claim 1, wherein the plurality of cloud resources are selected from a group consisting of: pods; services; deployments; secrets; roles; bindings; ingresses; gateways; and databases.

10. A tangible, non-transitory, computer-readable medium storing program instructions that cause a device to execute a process comprising:

parsing, as a service mesh manager associated with a control plane of a service mesh, a package manager chart to learn a plurality of cloud resources within the service mesh that are associated with a given application, thereby making the service mesh manager application aware for the given application;

injecting, by the service mesh, a respective sidecar proxy into each pod corresponding to the given application;

monitoring performance metrics for each individual resource for the plurality of cloud resources, wherein at least a portion of the performance metrics are generated based on traffic routed through the respective sidecar proxies;

aggregating the performance metrics for each individual resource into an overall performance level of the given application; and generating a holistic health report of the overall performance level of the given application that is further indicative of the performance metrics for each individual resource.

11. The tangible, non-transitory, computer-readable medium of claim 10, wherein the process further comprises:

parsing individual configurations of the plurality of cloud resources into specific resource configurations;

correlating the performance metrics with the specific resource configurations; and reporting the performance metrics as correlated with the specific resource configurations within the holistic health report.

12. The tangible, non-transitory, computer-readable medium of claim 11, wherein parsing individual configurations of the plurality of cloud resources into specific resource configurations comprises:

monitoring operation of the given application using a machine learning engine to detect the specific resource configurations.

13. The tangible, non-transitory, computer-readable medium of claim 11, wherein parsing individual configurations of the plurality of cloud resources into specific resource configurations comprises:

examining YAML files of the given application to learn the specific resource configurations.

14. The tangible, non-transitory, computer-readable medium of claim 10, wherein the process further comprises:

parsing individual software compositions of the plurality of cloud resources into specific software compositions based on a software bill of materials;

correlating the performance metrics with the specific software compositions; and reporting the performance metrics as correlated with the specific software compositions within the holistic health report.

15. The tangible, non-transitory, computer-readable medium of claim 14, wherein the process further comprises:

monitoring operation of the given application using a machine learning engine to provide insights based on the performance metrics as correlated with the specific software compositions.

16. The tangible, non-transitory, computer-readable medium of claim 10, wherein the process further comprises:

providing the holistic health report via a graphical user interface with representations of an overall health for the given application and an individualized health for each individual resource.

17. An apparatus, comprising:

one or more network interfaces to communicate with a network;

a processor coupled to the one or more network interfaces and configured to execute one or more processes; and a memory configured to store a service mesh manager process associated with a control plane of a service mesh that is executable by the processor, the service mesh manager process comprising:

parsing a package manager chart to learn a plurality of cloud resources within the service mesh that are associated with a given application, thereby making the service mesh manager application aware for the given application;

injecting, by the service mesh, a respective sidecar proxy into each pod corresponding to the given application;

monitoring performance metrics for each individual resource for the plurality of cloud resources, wherein at least a portion of the performance metrics are generated based on traffic routed through the respective sidecar proxies;

aggregating the performance metrics for each individual resource into an overall performance level of the given application; and generating a holistic health report of the overall performance level of the given application that is further indicative of the performance metrics for each individual resource.

18. The apparatus of claim 17, wherein the service mesh manager process further comprises:

parsing individual configurations of the plurality of cloud resources into specific resource configurations;

correlating the performance metrics with the specific resource configurations; and reporting the performance metrics as correlated with the specific resource configurations within the holistic health report.

19. The apparatus of claim 17, wherein the service mesh manager process further comprises:

parsing individual software compositions of the plurality of cloud resources into specific software compositions based on a software bill of materials;

correlating the performance metrics with the specific software compositions; and reporting the performance metrics as correlated with the specific software compositions within the holistic health report.

20. The apparatus of claim 17, wherein the service mesh manager process further comprises:

providing the holistic health report via a graphical user interface with representations of an overall health for the given application and an individualized health for each individual resource.

* * * * *